April 22, 1969  J. NICOL  3,439,941
WELDED TUBE FITTING
Filed July 27, 1966
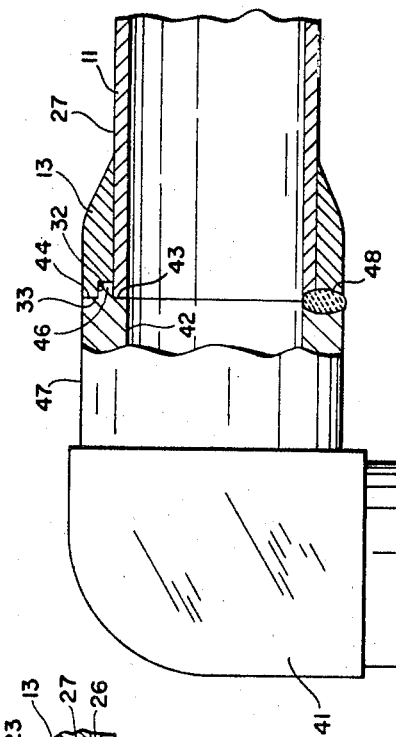
INVENTOR.
JOHN NICOL
BY
McNENNY, FARRINGTON, PEARNE & GORDON
ATTORNEYS United States Patent Office 3,439,941
Patented Apr. 22, 1969

3,439,941
WELDED TUBE FITTING
John Nicol, Fairview Park, Ohio, assignor to The Weatherhead Company, Cleveland, Ohio, a corporation of Ohio
Filed July 27, 1966, Ser. No. 568,298
Int. Cl. F16l 13/02, 47/02
U.S. Cl. 285—21
11 Claims

ABSTRACT OF THE DISCLOSURE

A welded tube coupling is disclosed which includes a sleeve swaged onto the end of a tube and formed with an axially extending cylindrical surface coaxial with the tube extending from the plane of the end of the tube. The coupling also provides a radial surface coplanar with the end of the tube extending inwardly from the outer surface of the sleeve. The tube and sleeve are adapted to interfit with a mating part which may be a fitting or a tube and sleeve assembly so that interfacial contact is provided along the entire joint. The coupling is then welded by the external application of fusion heat to fuse all of the abutting surfaces into a single weld extending from the interior of the tube to the exterior of the sleeve. The axially extending cylindrical surfaces provide proper radial alignment of the tube with the mating part and the abutting relationship of the outer radial surface establishes proper axial alignment. Also the joint provided by the radial surfaces provides an external indication of the proper location for the weld. The sleeve extends along the tube beyond the zone weakened by the application of welding heat and is provided with a tapered end so that the assembly has a zone of decreasing section modulus.

---

This invention relates generally to tube couplings and more particularly to a novel and improved welded tube coupling and to a method of manufacturing such a coupling.

A welded tube coupling incorporating the present invention is particularly suited for use in aircraft or space vehicles wherein lightweight structures are required which are capable of reliably withstanding high pressures and severe vibration conditions. In such installations high strength materials are used, such as precipitation hardenable AN 350 stainless steel. Such stainless steel provides great strength but is characterized in that substantial reductions in strength are encountered when it is subjected to the high temperatures required for welding. The present coupling is structurally arranged to compensate for reduced material strength in the weld zone so that the system strength is adequately maintained.

Summary of invention

The present invention is directed to a welded tube coupling and a method of forming the welded coupling wherein a sleeve is tightly positioned around the end of a tube and is provided with interfitting projections which radially locate the coupling parts before welding. During welding all of the interfitting faces are fused into a single weld so that the completed coupling consists of a unitary structure wherein the sleeve supports the tube on both sides of the weld.

The illustrated embodiments

Increased wall thickness is provided by a sleeve positioned over a tube end and arranged to tightly engage the outer surface of the tube at the weld and along the tube past the heat weakened zone to provide a coupling which has at least the same strength as the remaining tubing. A single weld joins the sleeve and the end of the tube to the mating parts. The sleeve is tapered at its remote end to provide a gradually reducing section modulus. This prevents locations of stress concentration and provides a structure which is substantially immune to failures caused by vibration.

In aircraft and space vehicle installations it is also necessary, in many instances, to install the tubing sections in the airframe and then weld the various couplings in the installed position. In such instances bench type fixtures cannot be used to insure proper positioning of the coupling ends. The present invention provides a structural arrangement wherein the coupling ends can be visually inspected prior to welding to insure precise positioning of the parts and also visually inspected after the welding to insure that the weld is properly made.

In one of the illustrated embodiments of this invention complementary sleeves are formed with interfitting axial projections. These sleeves are each positioned on a tubing end and are swaged onto the outer surface of the tube, so that the sleeves are secured in position prior to welding and so that all clearance is eliminated and tight contact is provided between each sleeve and its associated tube. This swaging operation is performed before the tubes are installed in the vehicle, so bench type fixtures are used to insure precise positioning and swaging.

The tubing sections are then installed in the vehicle and the mating ends are positioned for welding. The interfitting axial projections provide exact radial location of the two end assemblies. The two sleeves are also formed with mating radial faces adjacent to their outer surfaces so that any misalignment between the tubing parts produces a gap which can be seen or measured with a simple feeler gauge, therefore, it can be easily determined when the two end assemblies are in proper axial and radial alignment before the welding operation is performed. The sleeves and tubing are then joined by a single weld bead and it is possible to ascertain whether or not the weld is satisfactory by means of a final, external visual inspection.

In other illustrated embodiments of this invention various types of fittings are welded to a tube end. In such embodiments a single sleeve is swaged onto the tube end. The fitting and the single sleeve are formded with interfitting axial projections and mating radial end faces adjacent to their outer surface to again permit the use of visual inspection to determine the proper radial and axial alignment of the parts prior to welding. Here agin, a single weld is used to join all of the parts, so a final visual inspection can be used to determine whether or not the weld has been properly made.

It is an important object of this invention to provide a novel and improved welded coupling particularly suited for use with high strength tubing of the type which is weakened by the application of weld heat.

It is another important object of this invention to provide a novel and improved welded coupling including a sleeve positioned around a tube end in tight engagement with the outer surface thereof wherein the sleeve is formed with an axially extending projection adapted to interfit with a complementary part and insure proper radial positioning between the tube end and sleeve, and the mating part prior to welding.

It is another object of this invention to provide a novel and improved coupling according to the last preceding object wherein the sleeve and mating part are provided with mating radial end surfaces adjacent their periphery so that the axial alignment of the coupling elements can be visually determined.

It is still another object of this invention to provide a novel and improved coupling, according to any of the preceding objects, wherein all of the coupling parts are permanently joined by a single fusion weld which can be visually inspected.

It is still another object of this invention to provide a novel and improved coupling, according to the last preceding object, wherein the sleeve is swaged onto the end of the tube end before the tube sections are installed and welded, and wherein elaborate fixtures are not required to properly position the mating parts for welding.

Further objects and advantages will appear from the following description and drawings, wherein:

FIGURE 1 is a composite longitudinal section of a tube coupling, incorporating the present invention, used to join two pieces of tubing. The upper section of this figure illustrates the structure before welding and the lower section illustrates the structure after the welding operation is completed;

FIGURE 1a is an enlarged fragmentary section of the structure of FIGURE 2 illustrating the sleeves and tubes before welding;

FIGURE 2 is a composite view partially on longitudinal section illustrating a coupling arrangement for joining a fitting elbow to a piece of tubing. Here again, the upper portion of the joint illustrates the structure prior to the welding operation and the lower section of the figure illustrates the structure after the welding has been performed;

FIGURE 3 is another composite view, partially in longitudinal section, illustrating this invention when used to join a piece of tubing and a boss; and FIGURE 4 illustrates an embodiment of this invention wherein a piece of tubing is connected to a connectable fitting.

Referring to FIGURE 1, two similar pieces of tubing 10 and 11 are assembled with complementary sleeves 12 and 13, respectively. The sleeve 12 is initially formed with a central bore 14 proportioned to slip over the exterior surface 16 of the tubing 10 with a relatively close fit. After the sleeve 12 is properly positioned over the end of the tube 10 it is swaged inwardly until the inner surface of the central bore 14 tightly engages the exterior surface 16 of the tube 10 along its length. This operation is preferably performed in a manufacturing facility with accurate fixtures and tools so that the sleeve 12 is precisely located with respect to the end face 17 of the tube 10 and so that the assembled diameter after swaging is uniformly maintained.

The rearward end of the sleeve 12 is formed with a taper 18 extending to a junction at 19 with the central bore 14 and the forward end of the sleeve is provided with a cylindrical projection 21 having an end face 22 extending radially outward from the central bore 14 to a cylindrical surface 23 which constitutes the outer portion of the projection 21. A second radial face 24 extends from the cylindrical surface 23 to the outer surface of the ring 12 and is preferably in alignment with the end face 17 of the tube 10.

The ring 13, like the ring 12, is initially formed with a central bore 26 adapted to fit over the outer surface 27 of the tube 11 with a close fit. Here again, the sleeve 13 is swaged inwardly into tight engagement with the tube 11, preferably while the tube 11 and sleeve 13 are precisely positioned by accurate fixtures and tooling. A taper 28 is formed on the rearward end of the sleeve 13 and again extends to a relatively sharp edge at 29 where it joins with the central bore 26.

The forward end of the sleeve 13 is formed with a complemental or mating projection 31 having an inner cylindrical surface 32 proportioned to closely fit the exterior cylindrical surface 23 on the sleeve 12 and two radial surfaces 33 and 34. The radial surface 33 is proportioned to abut the radial surface 24 and the radial surface 34 is proportioned to abut the radial surface 22 when the two coupling assemblies are properly positioned with respect to each other. Here again, the outer radial surface 33 is preferably in alignment with the end face 36 of the tube 11.

The two projections 21 and 31 interfit so that the two coupling assemblies are accurately located radially with respect to each other when they are positioned in abutting relationship, as illustrated in FIGURE 1. Any misalignment between the two assemblies will cause a space or gap between the outer radial surfaces 24 and 33 and provide a visual indication of the alignment of the two coupling assemblies. If desired, a simple feeler gauge can be used to determine whether or not such gap exists and if so how much gap is present.

After the two pieces of tubing 10 and 11 are installed in the supporting frame structure, such as in the wing of an aircraft or the like, the ends of the assemblies are brought into abutting relationship and an inspection determines if they are in proper position for welding. The four parts, namely the two sleeves 12 and 13 and the tubes 10 and 11, are then welded with a single weld bead 37, preferably by fusion welding utilizing an electrode formed of tungsten, or the like. Because the joint between the two radial faces 24 and 33 is externally visible, it is possible to accurately locate the electrode for the welding operation.

In many instances a small fixture or welding head is clamped around the coupling and the electrode is power driven around the coupling to insure uniform welding operations. Also, the fixture may be arranged to provide a chamber which can be filled with a suitable gas to eliminate contamination of the weld.

The weld bead extends from the inner surface of the tubing to the exterior surface of the two sleeves 12 and 13 and has an axial length such that the two projections 17 and 31 are fused into the weld bead itself. Consequently, the two ends 17 and 36 of the tubing are fused together and also fused to both the sleeves 12 and 13. Because a single weld bead is used to join all four elements of the coupling, an external inspection of the weld establishes whether or not the weld is properly made.

The length of the two sleeves 12 and 13 is arranged so that they extend along the length of their respective tubes to a location wherein the initial tube strength is not impaired by the heat of welding. Consequently, the finished coupling provides additional wall thickness along the entire length of tube where the tubing material is weakened.

In most conventional tube couplings the length of the sleeves 12 and 13 should be arranged so that the full wall thickness of the sleeves is maintained for about one quarter of an inch beyond the weld bead. The tapered ends of the two sleeves result in a reducing section modulus toward the ends of the sleeves and prevent the occurrence of locations of stress concentration which could otherwise produce fatigue failures under vibration conditions. The fact that the two sleeves are in intimate contact with the tubes throughout their length, due to the swaging performed during the assembly, also prevents vibration induced failure. Generally, the wall thickness of the two sleeves 12 and 13 should be at least equal to the wall thickness of the tubing and the material forming the sleeves should be the same as the material of the tubing. Since the weld is formed by the coupling material rather than by adding additional material, contamination of the weld does not occur.

FIGURE 2 illustrates another embodiment of this invention wherein a tube which is identical to the tube 11 is provided with a sleeve which is identical in structure with the sleeve 13. In this instance, however, the coupling connects the tube 11 to an elbow or T 41. In this embodiment the elbow 41 is formed of a central bore 42 having a diameter equal to the inner diameter of the tube 11 and inner and outer aligned radial end surfaces 43 and 44. Between these end surfaces the elbow 41 is formed with the projection 46 which fits between the exterior surface 27 and the inner cylindrical surface 32 of the sleeve 13. The outer diameter 47 of the adjacent portion of the elbow 41 is preferably equal to the outer diameter of the sleeve 13.

Here again, the interfitting complementary surfaces provide precise radial location of the various parts and a visible gap occurs between the radial surfaces 44 and 33 in the event that axial alignment is not correct. After the mating parts are properly positioned a single weld bead 48 is formed to fuse the elbow 41 to both the tube 27 and sleeve 13. Also, the joint between the abutting radial surfaces 44 and 33 permits visual location of the proper place for the weld, and the single weld can be visually inspected to see that it is properly completed.

FIGURES 3 and 4 show the additional embodiments wherein a welded coupling connects a tube 11 to a boss 51 or to a connectable fitting assembly 52. The boss 51 is formed with a projection 53 which interfits with the sleeve 13 in the same manner as the elbow 41. Similarly, the connectable fitting assembly 52 is provided with a ring 54 shaped to interfit with the tube 11 and sleeve 13 in the same manner as the elbow 41.

It should be understood that, if desired, bosses, elbows, or connectable fittings can be shaped to fit with the tube 10 and sleeve 12 rather than with the tube 11 and sleeve 13.

I claim:

1. A tube end assembly having a welded coupling comprising a tube member having a substantially uniform cross-section and an end surface, a sleeve member positioned around said tube member firmly engaging the outer surface thereof, said sleeve member being formed with one end adjacent said tube end surface having locking surfaces interfitting in abutting engagement with complementary mating locking surfaces on a mating part with the end surface of said tube engaging a mating surface on said mating part, said locking surfaces including surfaces having axially spaced portions extending around the entire periphery of the sleeve to provide radial interlocking between said sleeve member and said mating part and substantially filling the radial space between the inner periphery of the tube and the outer periphery of the sleeve, the joint on the outer periphery of the sleeve with said mating part lying in substantial radial alignment with said tube end surface, said tube end assembly being welded to said mating part by a single weld bead produced by externally applying fusion heat along the joint between said outer periphery of said sleeve and said mating part so that all engaging surfaces are fused into a single weld extending the entire radial distance from the inner periphery of said tube member to the exterior periphery of said sleeve member for the entire circumferential extent of the joint.

2. A tube end assembly as set forth in claim 1 wherein said sleeve is formed with a taper at its other end extending substantially to a sharp edge to provide said assembly with a reducing modulus and to eliminate locations of stress concentration.

3. A tube end assembly as set forth in claim 2 wherein said tube is formed of a high strength metal the strength of which is reduced by the application of welding heat, and said sleeve extends along said tube with substantially uniform cross section for a distance greater than the length of tube weakened by welding heat.

4. A welded tube coupling comprising first and second tubes each of substantially uniform cross-section and having flat end surfaces, said tubes having substantially identical interior diameters, first and second sleeves each positioned around the end of the respective tube firmly engaging the outer surface thereof, each of said sleeves having an end face adjacent the end face of the tube, the end faces of said sleeves having complementary mating locking surfaces interfitting in abutting engagement with each other, said locking surfaces including surfaces having axially spaced portions extending around the entire periphery of the sleeve to provide radial interlocking between the sleeves when in abutting engagement, said sleeves being positioned axially on the respective tubes so that when said complementary mating locking surfaces are in engagement with each other said tube ends are in abutting engagement to substantially fill the radial spaces between the inner perpheries of the tubes and the outer peripheries of said sleeves, the joint on the outer peripheries between said sleeves lying in substantial radial alignment with the end surfaces of said tubes, said tubes and said sleeves being welded to each other by a single weld bead produced by fusion heat applied along the joint on the outer peripheries of said sleeves with said weld bead extending the entire radial distance from the inner peripheries of said tubes to the outer peripheries of said sleeves.

5. A welded tube coupling as set forth in claim 4 wherein the end face of each sleeve includes an axial projection whereby said locking surfaces includes interengaging cylindrical surfaces and radial surfaces on the end of said projections.

6. A welded tube coupling as set forth in claim 5 wherein said tube is formed of material which has reduced strength after being subjected to weld heat, said sleeve extending along said tube with a substantially uniform cross-section for a distance greater than the length of the welding heat weakened zone and being tapered at its other end to provide an end portion of reducing section modulus.

7. A welded tube coupling as set forth in claim 6 wherein the wall thickness of each of said sleeves is at least as great as the wall thickness of the adjacent tube.

8. A method of forming a welded joint between a tube and a mating part having an end face and a bore therethrough of substantially the same diameter as the internal diameter of said tube comprising forming an end surface including locking surfaces on said mating part end face, forming an end surface on said tube adapted to mate with the corresponding portion of said mating part end face, forming a sleeve having an end face with locking surfaces extending around the entire periphery of the end face to make abutting engagement with the corresponding locking surfaces on said mating part end face to provide radial interlocking between said sleeve and said mating part when said locking surfaces are in abutting engagement, positioning said sleeve over the end of said tube in firm engagement with the outer surface of said tube and with the junction between the outer periphery and end face of said sleeve lying in substantial radial alignment with the end surface of said tube, placing said tube and said sleeve in abutting engagement with said mating part with said tube in axial alignment with the bore of said mating part and said locking surfaces of said mating part end face and said sleeve end face in interlocking engagement thereby substantially filling the radial space between the inner periphery of the tube and the outer periphery of the sleeve, and applying fusion heat along the joint between said locking surfaces to form a single weld bead fusing together said tube and said sleeve and said mating part with said weld bead extending the entire radial distance from the inner surface of said tube to the outer surface of said sleeve.

9. A method of forming a welded joint as set forth in claim 8, wherein said locking surface on said sleeve and said mating part include a projection defining cylindrical surfaces and radial surfaces in abutting contact.

10. A method of forming a welded joint as set forth in claim 8 wherein said mating part is formed by a second tube and a second sleeve positioned thereon in tight engagement therewith.

11. A method of forming a welded joint as set forth in claim 8 wherein said sleeve and tube are initially formed with a radial clearance therebetween and one of them is deformed radially into tight engagement with the other.

(References on following page)

References Cited

UNITED STATES PATENTS

| | | | |
|---|---|---|---|
| 1,512,298 | 10/1924 | Mueller | 285—330 X |
| 1,716,195 | 6/1929 | Stockstrom | 29—486 X |
| 2,576,767 | 11/1951 | A'Hearn | 285—286 |
| 2,711,912 | 6/1955 | Boice | 285—286 |
| 3,194,936 | 7/1965 | Rohrberg et al. | 285—286 X |
| 3,248,134 | 4/1966 | Pennington | 285—286 |

FOREIGN PATENTS

| | | |
|---|---|---|
| 645,764 | 11/1950 | Great Britain. |
| 656,696 | 8/1951 | Great Britain. |

CARL W. TOMLIN, *Primary Examiner.*

D. W. AROLA, *Assistant Examiner.*

U.S. Cl. X.R.

285—24, 286, 334.4, 331, 417; 29—483